(12) United States Patent
Dale et al.

(10) Patent No.: US 11,526,478 B2
(45) Date of Patent: Dec. 13, 2022

(54) METHODS AND DEVICES FOR REMOVING UNWANTED DATA FROM ORIGINAL DATA

(71) Applicant: THE SECRETARY OF STATE FOR FOREIGN & COMMONWEALTH AFFAIRS, Cheltenham (GB)

(72) Inventors: Robert John Dale, Cheltenham (GB); John Alan Thorp, Cheltenham (GB)

(73) Assignee: The Secretary of State for Foreign and Commonwealth Affairs, Cheltenham (GB)

( * ) Notice: Subject to any disclaimer, the term of this patent is extended or adjusted under 35 U.S.C. 154(b) by 41 days.

(21) Appl. No.: 16/968,695

(22) PCT Filed: Feb. 14, 2019

(86) PCT No.: PCT/GB2019/000025
§ 371 (c)(1),
(2) Date: Aug. 10, 2020

(87) PCT Pub. No.: WO2019/158898
PCT Pub. Date: Aug. 22, 2019

(65) Prior Publication Data
US 2020/0409916 A1 Dec. 31, 2020

(30) Foreign Application Priority Data
Feb. 15, 2018 (GB) ..................... 1802454

(51) Int. Cl.
*G06F 16/00* (2019.01)
*G06F 16/215* (2019.01)
(Continued)

(52) U.S. Cl.
CPC ........ *G06F 16/215* (2019.01); *G06F 16/2365* (2019.01); *H04L 63/0227* (2013.01)

(58) Field of Classification Search
None
See application file for complete search history.

(56) References Cited

U.S. PATENT DOCUMENTS 7,072,296 B2    7/2006   Turner et al.
8,572,732 B2 *  10/2013  Muttik ................ G06F 21/57
                                                  709/228
(Continued)

FOREIGN PATENT DOCUMENTS

CN     1682474 A    10/2005
CN   101945116 A     1/2011
(Continued)

OTHER PUBLICATIONS

Makiou, A, et al. "Improving Web Application Firewalls to Detect Advanced SQL Injection Attacks," 2014 10th International Conference on Information Assurance and Security, Nov. 28, 2014, pp. 35-40, IEEE.

(Continued)

*Primary Examiner* — Bai D Vu
(74) *Attorney, Agent, or Firm* — Kilpatrick Townsend & Stockton LLP (57) ABSTRACT

There is described a device and method of removing unwanted data from original data for prohibiting unwanted data transfer between a first device and a second device along a communication pathway. The communication pathway includes at least one data channel and at least one control channel. The method includes providing programmable hardware at a position along the at least one control channel. Original data applied to the device includes control data and associated protocol data, the control data including wanted and unwanted data. The control data is checked to determine whether the associated protocol data conforms to at least one predetermined protocol mode criteria at the programmable hardware. The programmable hardware is (Continued)

terminated where the control data is deemed to be unwanted data. The resulting data which is left over is substantially free of unwanted data, enabling associated protocol data transmission along the data channel.

34 Claims, 4 Drawing Sheets

(51) Int. Cl.
*G06F 16/23* (2019.01)
*H04L 9/40* (2022.01)

(56) References Cited

U.S. PATENT DOCUMENTS

2003/0039263 A1    2/2003  Haislett
2013/0195160 A1*   8/2013  Whitby-Strevens ...... H04L 1/00
                                                        375/224

FOREIGN PATENT DOCUMENTS

| EP | 2418600 A1 | 2/2012 | |
|----|------------|--------|----|
| EP | 3270572 A1 | 1/2018 | |
| WO | WO-2012065632 A1 * | 5/2012 | ............. H04L 43/00 |
| WO | 2017118310 A1 | 7/2017 | |

OTHER PUBLICATIONS

International Patent Application No. PCT/GB2019/000025, International Search Report and Written Opinion dated Apr. 26, 2019, 14 pages.
United Kingdom Patent Application No. GB1901983.5, Combined Search and Examination Report dated Aug. 12, 2019, 2 pages.
United Kingdom Patent Application No. GB1802454.7, Combined Search and Examination Report dated Aug. 20, 2018, 9 pages.
Chinese Patent Application No. 201980013320.1, Office Action dated Aug. 15, 2022, 21 pages.

* cited by examiner

METHODS AND DEVICES FOR REMOVING UNWANTED DATA FROM ORIGINAL DATA

The invention is in the field of data validation and assurance, typically where a source of original data is made available to or is otherwise stored on a first data device, or is intended to flow between a first data device and one or more second data device(s). More particularly, such original data may be for the purpose of or intended to display or be displayed, be that on a first data device, or on or via one or more second data device(s).

Until recently the main method in which original data originating, available from, or stored on a first data device for the purpose of or intended to display or be displayed, be that on said first data device, or on or via one or more second data device(s), would be transmitted to a second data device, such as a separate display means, would be by using the Video Graphics Array (VGA) analogue standard using a 15-pin connector (be that the DB15 PC connector or the Macintosh type) to effect data flow. As modem data devices typically produce digital signals, in order for them to be transmitted using VGA connection types they must be converted to an analogue signal, and as most modem separate display means are also digital, a further conversion back to a digital signal must take place. This takes time and risks a loss of fidelity through each conversion.

To overcome this problem techniques have been developed to permit display signals to be transmitted using digital connection types and/or standards, which can thus use connection types other than VGA. This permits a digital transmission to take place without the need to convert data one or more times, reducing time and the risk of data loss. However, such connection types can permit a broader range of data to flow than the user intended, such as a request to deposit new, modify or copy data, or to change settings on a first data device such, as older connection types such as VGA are limited in that respect.

For example HDMI has advantages over existing audio interfaces such as analog RCA connectors and digital SPDIF (coax and optical connectors). HDMI maintains the audio in its pure digital form all the way to the amplifier and beneficially, HDMI combines video and multi-channel audio into a single cable, eliminating the cost, complexity, and confusion of multiple cables currently used in A/V systems. Further, HDMI has 'intelligence' because it supports two way cornmunication between the audio source (such as a DVD player) and the audio rendering device (such as an A/V receiver). This set up enables new functionality such as automatic configuration and one-touch play. By using HDMI, devices are capable of automatically delivering the most effective format for the A/V receiver that it is connected to. This eliminates the need for the consumer to scroll through all the audio format options to guess what is best and properly supported. This intelligence provides the problem of an increased attack surface for malicious users to target.

Accordingly there is thus provided a method of removing unwanted data from original data for prohibiting unwanted data transfer between a first device and a second device along a communication pathway located therebetween, the communication pathway comprising at least one data channel and at least one control channel, the method comprising:

providing a negotiation means at a position along the at least one control channel;

providing original data comprising control data and associated protocol data from a data source, the control data comprising wanted and unwanted data;

checking that the control data indicates that the associated protocol data conforms to at least one predetermined protocol mode criteria at the negotiation means;

terminating the negotiation means and determining the control data to be unwanted data where the control data does not indicate the associated protocol data to conform to the at least one protocol mode criteria; and leaving resulting data which comprises control data which is substantially free of unwanted data enabling associated protocol data transmission along the data channel.

Specifically the method enables protocol data transmission along the data channel between the first and second device.

The control data can be considered to describe at least one property of the protocol data and as such the protocol data can be considered to be 'associated protocol data'.

The negotiation means is specified as being located along the communication pathway, and in particular along the control channel. The negotiation means may therefore be provided in a position intermediate the first and second device, e.g. integral to a cable positioned therebetween, or between a first and second cable forming at least part of the communication pathway, Alternatively, the negotiation means may be provided at or in the first device or at or in the second device. What is imperative is that the communication pathway is communicatively coupled between the first and second device, with the negotiation means being located along at least part of the communication pathway.

An original data device source may comprise for example, a computational device comprising a desktop or laptop computer, tablet, personal digital assistant (PDA), mobile phone, smart watch, hard disc, solid state disc or drive, memory, or other smart or mobile device capable of storing and/or displaying data or otherwise acting as a data device, or a display device comprising a monitor, projector, screen or the like capable of storing and/or displaying data or otherwise acting as a data device.

At the checking step of the method, the negotiation means inspects the control data which describes the protocol mode of the protocol data. The negotiation means then compares the inspected information with the predetermined data protocol criteria and makes an assessment as to whether the control data being inspected is unwanted data or wanted data. For avoidance of doubt, the data which is substantially free of unwanted data is wanted data.

The control data is configured for transfer along the control channel and the protocol data is configured for transfer along the data channel.

Termination of the negotiation means occurs along the control channel and considers solely the control data which is a descripter of the associated protocol data. This is required to prevent the e.g. laptop from hanging in a negotiation and to ensure the method switches to the operative stage of transporting the data or a new negotiation stage as required.

Data is determined as being supported by the data transfer means when the selection criteria comparison at the negotiation means provides a positive/true result. Similarly the data is determined as being unsupported where selection criteria comparison at the negotiation means provides a negative/false result. At no point is the content of the protocol data on the data channel assessed directly or discarded as a result of direct assessment as per known prior art e.g. EP2418600.

Effectively, the negotiation means is required to negotiate the content that each of the data channels is permitted to pass and may beneficially specify the direction of passage of any data.

The step of determining the control data that is unwanted may be considered to be achieved by defining, classifying or tagging the control data to be unwanted data in the case that the control data does not indicate the associated protocol data to conform to the at least one protocol mode criteria.

Ultimately, the benefit of the invention is to remove the unwanted control channel data so as to prevent the enablement of a data pathway being negotiated along the data channel itself. So the filtration of unwanted information occurs in the control channel and there is no requirement for inspecting the protocol data information or other data content itself. This provides a more reliable way of reducing the attack surface exposed by a trusted device to a lesser trusted device than attempting exhaustive assurance of all possible protocols, protocol modes, and protocol data. The negotiation means effectively acts as a filter to sort the wanted data from the unwanted data using the control data along the control channel.

Termination of the negotiation means may comprise discarding as unwanted data any control data that does not indicate the associated protocol data to conform to the at least one protocol mode criteria.

Alternatively, termination of the negotiation means comprises generating and forwarding a response to the first data device indicating the control data is unwanted data.

Unwanted data consequently means that the associated protocol data in question is unsupported by the device.

Desirably, terminating the negotiation means may comprise transforming the unwanted data and forwarding a response to the first data device indicating the control data to be unwanted data.

Transforming the unwanted data means modifying the control data as required. For example if the control channel permits connection to a predetermined screen specification, the negotiation step will set the control criteria to specify this requirement. This control data will be forwarded along the control channel to the second device. The second device (which does not have a monitor with the correct criteria) may indicate that the criteria has been met in the hope to enable the transfer of malicious data or data that is not to be supported. However, by monitoring the control data, the negotiation means will identify that this protocol mode criteria has not been met and will modify the response from the second device prior to it being received by the first device.

Modifying the data may include but will not be limited to; changing its format from one file type to another, converting the data to one or more specified formats, testing the format the data claims to be to ensure it is that file type, moving it to or through a "sandbox" or other safe environment or the like, any or all of which individually or collectively may provide the user with additional assurance that, for example, the data discarded is not malicious, or if it is, that it is unable to function as it may have wished to.

Prior to checking that the control data associated with protocol data conforms to at least one predetermined protocol mode criteria, the method may further comprise the step of pre-determining one or more protocols to support;
checking that control data indicates the associated protocol data to conform to the one or more protocols to support, and
terminating the negotiation means where the control data does not indicate associated protocol data to conform to any one or more of the protocols to support.

Determining one or more protocols to support permits the user to select those of interest, data types that do not conform to the one or more protocols to support are discarded, leaving remaining data. Such protocols may for example comprise the Internet Protocol (IP) and specific versions thereof, for example version four (IPv4) or version 6 (IPv6) or indeed both, should the user so wish.

It is reiterated that the invention is intended to prevent the negotiation or completion of a positive negotiation at the negotiation means in the case that the protocol is not deemed to be supported.

As an example, in a preferred embodiment, the remaining data (which has been determined to be protocol data that is to be supported) is then assessed against protocol mode data to be supported, and any which does not comprise any one or more of;

display resolution data,
colour depth data,
frame rate data, or
audio data is discarded, leaving resulting data, which is substantially free of unwanted data.

The method will thus assure a user that resulting data has been checked for these criteria, and is substantially free of unwanted data (which does not conform to the predetermined protocols and protocol modes e.g. data types specified).

Preferably, the control channel may be bi-directional. The bi-directionality enables the negotiation to take place between the first and second device along the control channel.

The method may further comprise predetermining a directionality constraint on the at least one supported protocol data to be transported along the data channel.

The unidirectional nature of the data channel ensures that data can pass in a single direction only. The unidirectional nature may be provided by unidirectional amplifiers, SerDes pins or other unidirectional components.

The method may further comprise enforcing the directionality constraint on any protocol data transfer along the at least one data channel.

The method may further comprises discarding any protocol data, protocol mode data or other data that violates the directionality constraints along the at least one data channel.

The method may further comprise preventing the negotiation along the control channel for unwanted data thereby triggering the disabling of access to predetermined hardware of the second data device from the first data device or vice versa.

Desirably, the method of removing unwanted data from original data may further comprise the following steps;

identifying at least one return lane in the communication pathway from each of the at least one second data device, discarding control data in said return lane that does not comprise control data indicating associated protocol data which conforms to the one or more protocol mode criteria.

For the avoidance of doubt, the one or more protocol mode criteria are the protocol modes to be supported.

The method may further comprise the following steps;
pre-determining a range of acceptable variables against which the protocol data mode criteria is determined.

The method may further comprise enabling modification of the variables at a trusted device. The user will understand that either the first or second device may be the trusted device and the selection of the variables to define the one or more protocols to be supported will be carried out on the trusted device rather than the lesser trusted device. The trusted device will be (for example purposes only) a users laptop and the lesser trusted device may be a projector which is to be communicatively coupled to the users laptop. The user will not know whether the projector includes malicious files that could potentially be transferred to the users laptop. This ensures that the variables can be updated by the user as desired e.g. the user can change the variables to enable a specific monitor type to be communicatively connected. The criteria may define which type of device is to be connected to the trusted device.

The range of acceptable values is pre-determined for any one or more of; display resolution data, colour depth data, frame rate data and/or audio data, and after the step of discarding remaining data which does not comprise any one or more of display resolution data, colour depth data, frame rate data and/or audio data, that data is verified as fitting within said range of acceptable values for the respective data type, and any data which does not is discarded.

This permits a user to ensure data purporting to comprise any of the above mentioned data types conform to acceptable ranges of values, to ensure that, for example, they behave in a manner consistent with those data types, providing further assurance for the user that it is not merely purporting to be such data, and in fact comprises something the user may otherwise not want or be expecting.

The at least one data channel may comprise a communications pathway where the data transfer occurs at a faster rate than the data passing along the control channel.

The protocol data and subsequent data may be passed along the fast speed communications pathway forming the protocol data channel without any further negotiation means being applied.

The subsequent data forwarded along the data channel once the negotiation has been successful along the control channel is not monitored or assessed, in fact the speed of the channel is configured such that such monitoring is not feasible by low cost devices. Therefore, after the negotiation has been successful, the device enters a transmission mode which is only terminated by the initiation of a further negotiation stage or termination of the connection, i.e. by disconnecting the communications pathway, for example by unplugging the cable at one or both ends. Fast means the data is transferred along the data channel at a higher data rate than the control data is passed along the control channel. The selected speed of data passing along the control channel ensures that the negotiation and criteria inspection can be performed. In contrast, there is no requirement for the data passing along the at least one data channel to be monitored. So for a given power/cost/form-factor envelope there may be identifiers that can be checked syntactically and semantically (which is effectively the control data) and there is then information that cannot be checked (e.g. protocol data). To check protocol data the code must run fast enough with enough resources e.g. do 1,000,000 operations per second. This cannot be achieved within a 1 W/$1/1 cc volume envelope of a connector. However, 1000 operations per second for the control channel in that same form factor can be achieved which is sufficient to characterise a protocol and associated protocol modes as wanted or unwanted.

Whilst the first device is the trusted device and the second device is the lesser trusted device, it is also envisaged that the trusted device may be the second device.

The fast speed communications means may be unidirectional permitting passage of data from the first data device to the at least one second data device only (or vice versa depending on the orientation of the channel).

The method may further comprise the following steps;

assessing at least one channel in the original data, identifying high speed channels and verifying they are unidirectional;

if any high speed channels are not unidirectional, the step of discarding all original data attempting to pass in the reverse direction is performed.

The channels may alternatively be referred to as lanes. This arrangement permits a user to assure themselves that lanes which purport to be high speed behave in a manner consistent with genuine high speed lanes. If they do not, all data is discarded, in effect substantially halting all data from exiting the method.

The hardware filtration method ensures that there is no 'reach-back' from the at least one second data device to the first data device and that the one way transfer of data is only received by the areas of the at least one second data device that have been determined as being permitted for receipt of the data.

This ensures that there is no confusion between the low speed lanes where the return lanes are permitted and the high speed lanes that are by design unidirectional.

The method may further comprise the step of retaining control data which has been discarded to enable use elsewhere.

This permits a user to identify what data will be discarded, and thus will not enable the protocol mode data to pass along the data channel, which may be of interest to the user in determining what that data is, and if for example, its source or any patterns may be identified.

There may be provided a third device and the method may further comprise forwarding the discarded data to the third device.

The predetermined protocol mode criteria may be defined as a protocol mode comprising an image data type.

Alternatively or additionally, the image data type may conform to any one or more of display resolution, colour depth and/or frame rate data types.

As mentioned previously, resulting data comprises only one or more of; display resolution data, colour depth data, frame rate data and/or audio data, which would ordinarily be used for the purposes of display and/or presentation (or as part thereof), which could thus be displayed on a single, first data device, or alternatively could be sent from such a first data device to one or more second data device(s) should the user so wish. The skilled person will appreciate that if original data only comprises any one or more of; display resolution data, colour depth data, frame rate data or audio data, resulting data may be no different to original data, however the user can thus be assured there is nothing additional or extraneous included that they were not expecting.

The predetermined protocol mode criteria may be defined as a protocol mode comprising at least one audio data type.

The at least one audio data type conforms to any one or more of audio protocol, audio sampling frequency, audio sampling rate, number of audio channels, bit rate of audio channels, audio encoding format and directionality of audio data.

Audio protocol may equate to the identification of Pulse Mode Modulation (PMM), which is common, but there are also many formats that may be desirable to monitor e.g. various bitrates of mpeg compressed formats. Audio sampling frequency is usually 44.1 kHz or 48 KHz, but there are others in use. Sampling frequency does not apply to compressed formats generally although bitrate can be used analogously. Separate audio channels usually range between 1 and 8, with mono, stereo, 5.1 surround and 7.1 surround being typical ones. Channel number can go up to 48 in Advanced Audio Coding (AAC) with an additional 16 low frequency channels. Concerning directionality, audio can flow two ways for example in home cinema where the screen may receive sound from the DVD to play through its speakers, or alternatively the sound may obtain sound from an inbuilt tuner and transmit it via the DVD to the audio amplifier.

In an alternative embodiment of the invention there is provided a device for assuring unwanted data is removed from original data arranged to implement the herebefore mentioned method steps, the device comprising a first connection, a second connection spaced apart from the first connection, a communications pathway positioned between the first and second connection, the communications pathway comprising at least one data channel and at least one control channel separate and distinct from the data channel, wherein the control channel comprises a negotiation means.

The first device, negotiation device, and second device are connected in series. The negotiation device comprises identical connectors to those presented by the first and second device so as to simulate the direct connection between the first and second device. Such a device configuration is convenient for the user as it may permit the user to assure themselves the method is appropriately deployed.

This arrangement is necessary to ensure that the first device believes that it is communicating directly with the second device and the second device believes as it is communicating directly with the first device, when in fact there is the device incorporating the negotiation means positioned therebetween to ensure that a correct data filtration along the control channel is provided.

The connection may in its simplest form comprise a point on a track on a circuit board. It is the point on the track where the first device believes it is negotiating with the second device. Similarly the second connection may in its simplest form comprise a point on the track on a circuit board. The second connection is the point on the track where the second device believes it is negotiating with the first device. Neither device is aware of the presence of the negotiation means/ negotiation device/intermediary device.

Alternatively, the at least one of the first connection and the second connection may comprise a connector or a display port. In this alternative embodiment, the first connector is the device input and the second connector is the device output.

There may also be provided at least one further connection. The at least one further connection may also comprise a display port. The display port for each of the devices may comprise a 8P8C, a USB, an HDMI, a VGA type connection, or another suitable type commercially available.

Such connections are well-known, cheap and supported by many platforms without requiring modification to hardware; an 8P8C being more commonly known as an RJ45.

There may also be provided an LED or incorporated display flashing red or displaying and error message.

The device may comprise a processor having software to be executed to provide at least a portion of the negotiation stage along the control channel.

The hardware core may comprise a Field Programmable Gate Array, an Application Specific Integrated Circuit, a general purpose platform (e.g. System on a Chip form factor) with appropriate software, a general purpose platform (e.g. System on a Chip form factor) with appropriate software or a dedicated circuit.

Such hardware is well-known, cheap to purchase, simple to configure and well supported, thus provides ease and flexibility for the user to deploy the method.

The at least one data channel is a unidirectional channel. Preferably all of the data channels are unidirectional. Further, the unidirectional nature of the data channel may be provided by a hardware component.

In an alternative embodiment of the invention there is provided a computational device comprising a device as herebefore mentioned for assuring unwanted data is removed from original data.

Computational devices comprising a desktop or laptop computer, tablet, personal digital assistant (PDA), mobile phone, smart watch, hard disc, solid state disc or drive, memory, or other smart or mobile device capable of storing and/or displaying data or otherwise acting as a data device, or a display device comprising a monitor, projector, screen or the like, capable of storing and/or displaying data or otherwise acting as a data device are also disclosed, which may individually and/or collectively comprise a device as outlined above for the user's convenience.

When the device is integrated into the first device i.e. a trusted computational device, the first connection may no longer relate to a port or connector and may be the point at which the data enters the device for control data filtration and the second connection may refer to the external port.

In an alternative embodiment of the invention there is provided a peripheral device located externally to the first device comprising a device as herebefore mentioned for assuring unwanted data is removed from original data. The device is therefore integrated within the peripheral device. The first connection may refer to an external port or connector, however the second connection may be the point at which the data exits the negotiation device that provides the control data filtration so as to pass the data to the peripheral device as required.

The peripheral device may comprise a projector, hard disk, keyboard, display, camera, network or other device considered by the person skilled in the art to be a peripheral device. It is a device that is to be communicatively coupled with the first device and is considered to be the second device in the herebefore mentioned method. The peripheral device may be connected to the first device temporarily, or on a longterm basis.

Such a device for removing unwanted data may be used with IOT products or display devices, as may be desired (for example smart fridges).

The resulting data therefore comprises control data considered to be wanted data.

To reiterate, optionally there is provided a method of removing unwanted data from original data wherein original data and/or remaining comprises a flow of data arranged in to one or more lanes between a first data device and one or more second data device(s).

This permits the user to apply this method between a first and a second (or more) data device(s). A lane is the common term used to reflect a flow of data in one direction. If one lane is present, data is simply flowing one way. If there are two or more lanes such a flow of data may be bi-directional, alternatively or additionally more than one lane may be used to segregate data in the same direction, such that high-speed data can be provided with one or more dedicated lane, and low speed data may also be provided with one or more dedicated lane. How lanes are organised is dependent on the user's preference, the protocol(s) used, hardware (if present) and any limitations or configuration therein. The one or more second data device(s) may also comprise a computational device, however for ease of explanation the skilled reader may consider it typically to comprise a display device, be that a monitor, projector, screen or the like capable of storing and/or displaying data or otherwise acting as a data device, for a typical purpose of displaying data irrespective of its origin. Such data intended to be displayed may comprise by way of example only, fixed or moving imagery, audio, text or the like, or any combination thereof.

Optionally there is provided a method of removing unwanted data from original data and/or remaining data wherein original data and/or remaining data comprises a flow of data between a first data device and one or more second data device(s), wherein the first data device is suitable for permitting a flow of data therefrom, and resulting data is permitted to continue to the one or more second data device(s).

This permits the user to apply this method between a first data device which is suitable for permitting a flow of data therefrom, for example with a specific configuration, and the method permits resulting data to continue to a second (or more) data device(s).

Optionally there is provided a method of removing unwanted data from original data comprising identifying at least one return lane in the flow of data from each of said second data device (s), and data in that return lane that does not comprise display identification data described in a data format such as the extended display identification data (EDID) format including data items such as screen resolution data is discarded.

If there is no return lane (because perhaps there is only one lane) then no data is discarded. It is only if a return lane is identified that this step will then assess its content. This permits the user to know that data sent from any second or more data device back is limited to display identification data, and nothing else the user may otherwise not want or be expecting will be present, as it is discarded.

Optionally there is provided a method of removing unwanted data from original data wherein one or more input device type which is supported is pre-determined, and data that does not conform to said device type is discarded; be that original data and/or remaining data and/or data in a return lane from one or more second data device(s). This permits a user to be specific as to the type of device it will accept data from, and will reject those it does not, ensuring no malicious or unacceptable input device types support, provide or supply original data, or indeed acts as a one or more second data source(s).

It may be desirable to optionally provide a method of removing unwanted data from original data wherein such use elsewhere comprises appending the copy of discarded data to original data and/or remaining data which has not been discarded.

This allows a user a convenient way of having access to both the data which exits the method, and that which the method has otherwise discarded which is now modified, for the purposes of, for example, reporting or analysing the totality of original data, or any part thereof, with the confidence that data which would otherwise have been discarded is modified, thus this does not permit merely original data through. The user may select which of original data and/or remaining data is appropriate to append this to, which may of course result from earlier method steps.

In an alternative embodiment of the invention there is provided a method of removing unwanted data from original data for disabling access to predetermined hardware of a second data device from a first data device, comprising:

providing a communication pathway between the first data device and second data device;

providing a negotiation means at a position on the communication pathway;

providing original data from the first data device, the original data comprising wanted and unwanted data;

checking that the original data conforms to an image data type and/or audio data type at the negotiation means;

discarding as unwanted data any original data that does not conform to the image data type and/or audio data type, and leaving resulting data which is substantially free of unwanted data which determines the permitted hardware of the second data device that can receive further data from the first data device.

It can be appreciated that use of the data associated with the image data type or audio data type will only be received by the trusted part of the at least second data device to meet the objective of outputting the visual data or audio data in the desired way.

Whilst the invention has been described above it extends to any inventive combination of the features set out above, or in the following description, drawings or claims. For example, any features described in relation to any one aspect of the invention is understood to be disclosed also in relation to any other aspect of the invention.

The invention will now be described, by way of example only, with reference to the accompanying drawings, in which:—

In the Figures like elements are denoted by like reference numerals.

Figure 1:
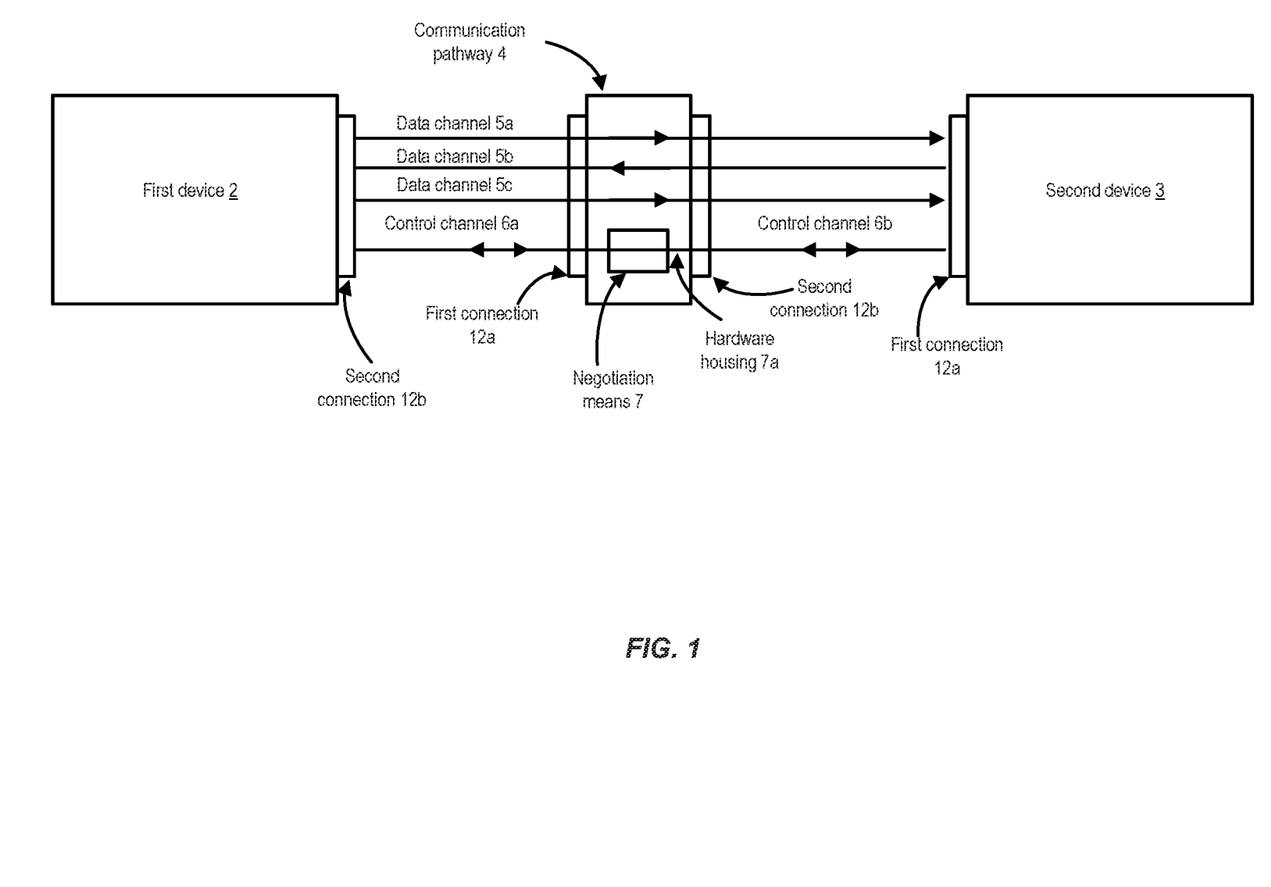
FIG. 1 shows a schematic representation of a protocol and/or protocol mode gateway according to the invention.

Referring to FIG. 1, there is shown a first embodiment of the invention where there is provided a device 1*a* for use in a system 1*c* for assuring unwanted data is removed from original data thereby prohibiting unwanted data transfer between a first device 2 and at least one second device 3 along a communication pathway 4 located therebetween, comprising a first connection 12*a*, a second connection 12*b* spaced apart from the first connection 12*a*, a communications pathway 4 positioned between the first connection 12*a* and second connection 12*b*, the communications pathway 4 comprising at least one data channel 5*a*, 5*b*, 5*c* and at least one control channel 6 separate and distinct from the at least one data channel 5*a*, 5*b*, 5*c*, wherein the control channel 6 comprises a negotiation means 7.

The negotiation means comprises a hardware core comprising hardware components.

The hardware core comprises a Field Programmable Gate Array, an Application Specific Integrated Circuit, a general purpose platform (e.g. System on a Chip form factor) with appropriate software or a dedicated circuit. In this embodiment a Field Programmable Gate Array is applied which is cheap to buy, can easily cope with the plurality of connections as described above, and provides for simple configuration, diagnostics and testing. Alternatively where a dedicated circuit is used a user may specify hardware particular to their circumstances.

The device further comprises a processor (not shown) having software to be executed to provide at least a portion of the negotiation along the control channel.

There is provided at least one further connection (not shown) in the form of a connector. This enables the negotiating means to be connected to a third data device to enable the transfer and storage of discarded data. The data channel comprises a uni-directional channel provided by a hardware component. In contrast, the control channel is bi-directional to enable the negotiation between the first device 2 and the second device 3 to take place.

The first connection 12a and the second connection 12b of the device is a connector comprising a display port. For example, the display port is an 8P8C, a USB, an HDMI, or a VGA type connection. In this embodiment to provide maximum flexibility for the user all four of these connection types are provided as both first and second connections. To save on cost a user may consider specifying fewer connections, or simply those appropriate to their circumstances. The first and a second connection may be configured for wired or wireless use.

In use, the device carries out a method 1b of removing unwanted data from original data for prohibiting unwanted data transfer between a first device 2 and second device 3 along a communication pathway 4 located therebetween, the communication pathway 4 comprises at least one data channel 5a, 5b, 5c and at least one control channel 6. The method as shown in part of FIG. 2 comprises:
  providing a negotiation means 7 at a position along the at least one control channel 6;
  providing original data 8 comprising control data 9 and associated protocol data 10 from a data source (not shown), the control data 9 comprising wanted and unwanted data;
  checking that the control data 9 indicates that the associated protocol data 10 conforms to at least one predetermined protocol mode criteria at the negotiation means 7;
  terminating the negotiation means 7 and determining the control data 9 to be unwanted data where the control data 9 does not indicate the associated protocol data 10 to conform to the at least one protocol mode criteria; and
  leaving resulting data 16 which comprises control data 9 which is substantially free of unwanted data enabling associated protocol data transmission along the data channel 5.

The negotiation means 7 is located in a hardware housing 7a. The negotiation step can be terminated at the negotiation means 7 by discarding as unwanted data any control data 9 that does not indicate that the associated protocol data 10 conforms to the at least one protocol mode criteria. Further, terminating the negotiation means 7 comprises generating and forwarding a response to the first data device indicating the control data 9 to be unwanted data.

The termination of the negotiation means 7 also comprises transforming or modifying the unwanted data and forwarding a response to the first data device 2 indicating the control data 9 to be unwanted data.

Prior to checking that the control data 9 associated with protocol data 10 conforms to at least one predetermined protocol mode criteria, the original data 8 is checked to determine whether the control data 9 indicates the associated protocol data 10 to conform to the one or more protocols to support. Termination of the negotiation means 7 is initiated where the control data 9 does not indicate associated protocol data 10 to conform to any one or more of the protocols to support.

The control channel 6 is configured to be bi-directional enabling control information or control data 9 to be passed between the first device 2 and the second device 3 (and vice versa). This differs to the directionality criteria which is applied to the data channel 5a, 5b, 5c, of the communication pathway 4 whereby a directionality constraint is set on the at least one supported protocol data 10 to be transported along the data channel 5a, 5b, 5c. This directionality constraint is strictly enforced on all protocol data 10 transferred along the data channel 5a, 5b, 5c. Any protocol data 10, protocol mode data or other data that violates the directionality constraint is discarded. By preventing the negotiation along the control channel for unwanted data, access to predetermined hardware of the second data device 3 from the first data device 2 or vice versa is disabled.

The method further identifies at least one return lane in the communication pathway 4 from the second data device 3 and subsequently discards control data 9 in the return lane that does not comprise control data indicating associated protocol data which conforms to the one or more protocol mode criteria. The device is configured for the user to select a range of acceptable variables against which the protocol data mode criteria can be compared. This selection occurs on the trusted side of the network.

The data channel 5 is configured to transfer protocol data 10 at a rate that is faster than the control data 9 transfer along the control channel 6. The protocol data 10 and subsequent data is passed along the fast speed communications pathway forming the data channel 5a, 5b, 5c without any further negotiation means being applied along the control channel 6. The fast speed communications means is unidirectional permitting passage of protocol data from the first data device 2 to the second data device 3 only (or vice versa where the second data device is determined to be the trusted side of the system).

The device is further configured to assess at least one channel in the communications pathway 4 along which the original data 8 is to be passed, identify high speed channels and verify they are unidirectional. In the case that any high speed channels are not deemed to be unidirectional, all original data 8 attempting to pass in the reverse direction is discarded.

In most instances it is desirable to retain control data 11 which has been discarded to enable use elsewhere. This retained control data 11 is forwarded to and stored in a third device (not shown).

Whilst this device works as an effective protocol filter making it suitable to use as a protocol gateway device for use with IOT devices, there is an existing need for such an alternative protocol gateway device for use with currently available audio visual equipment.

Therefore in an embodiment of the invention, the predetermined protocol mode criteria is defined as a protocol mode comprising an image data type, wherein the image data type conforms to any one or more of display resolution, colour depth and/or frame rate data types.

Further, the predetermined protocol mode criteria is defined as a protocol mode comprising at least one audio data type, wherein the at least one audio data type conforms to any one or more of audio protocol, audio sampling frequency, audio sampling rate, number of audio channels, but rate of audio channels, and directionality of audio data.

Figure 2:
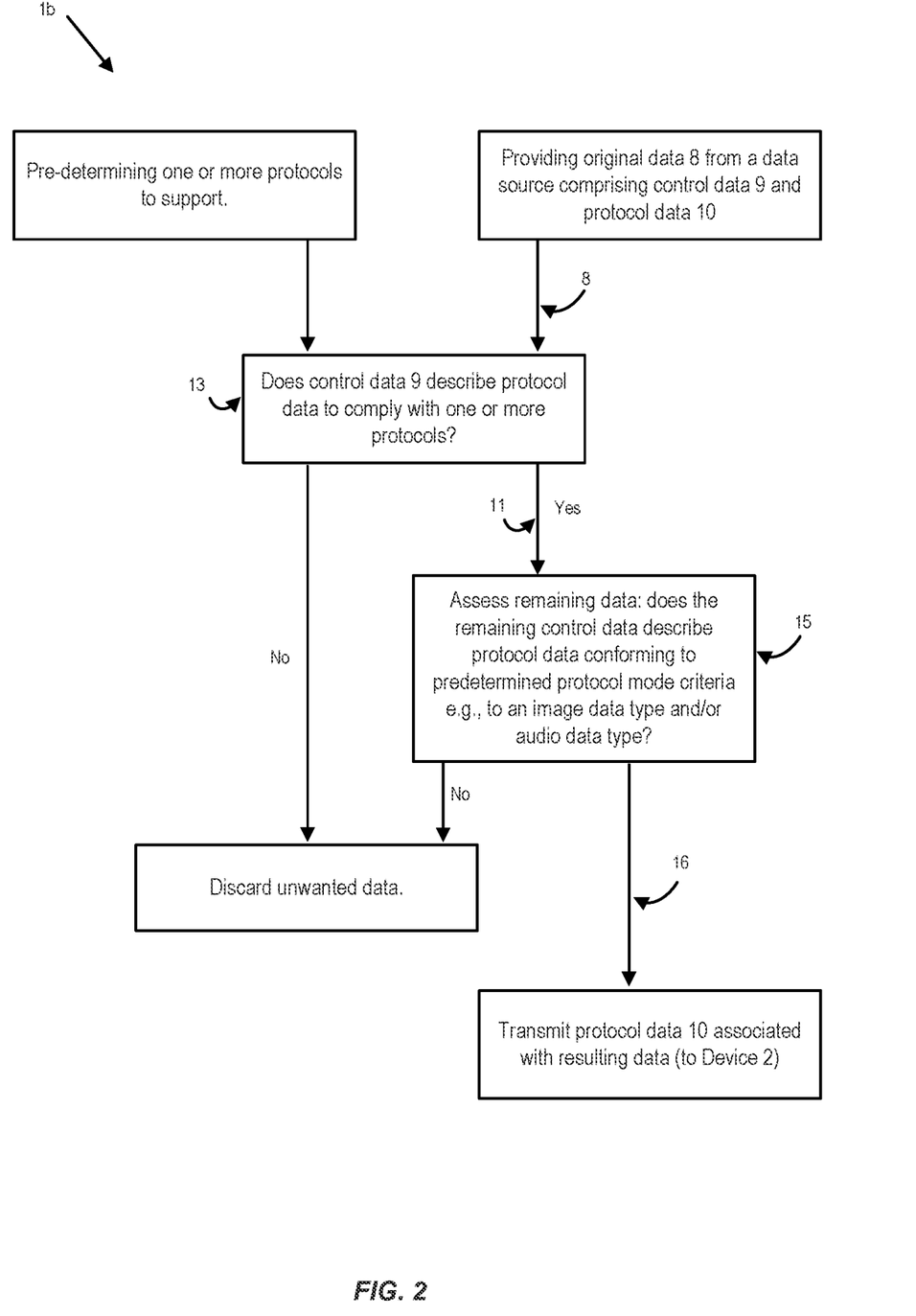
FIG. 2 shows a simple flow diagram of the method steps applying through a first embodiment of the method from original data through the steps to achieve resulting data.

The following additional method steps are carried out on the original data 8 as shown in FIG. 2:

Checking that the original data 8 conforms to the one or more protocols to support 13, discard original data 8 that does not conform to any one or more of said protocols to support 13 leaving remaining data 11, Assessing the remaining data 11 and check that it conforms to an image data type and/or audio data type. The image data type, for example is any one or more of;
display resolution,
colour depth or,
frame rate data types 15. Any remaining data 11 that does not conform to any one or more of said data types 15 is discarded, leaving resulting data 16, which is substantially free of unwanted data. A user is able to apply the method 1*b* to a first data device 2 which may comprise for example, a computational device comprising a desktop or laptop computer, tablet, personal digital assistant (PDA), mobile phone, smart watch, hard disc, solid state disc or drive, memory, or other smart or mobile device capable of storing and/or displaying data or otherwise acting as a data device, or a display device comprising a monitor, projector, screen or the like capable of storing and/or displaying data or otherwise acting as a data device.

This means the user can be assured that the original data 8 has been assessed, and at the end of the method 1*b* any resulting data 16 that remains is substantially free of unwanted data. This is of importance when checking original data 8 of their own, or of third party origin.

The method 1*b* will pre-determine one or more protocols to support 13, which may include for example IPv4 and IPv6 in this embodiment. Any data which is not either IPv4 or IPv6 will thus be discarded. That which remains comprises remaining data 11.

As remaining data 11 is all IPv4 or IPv6 in this embodiment, it is then checked to determine that the payload of each packet conforms to any one or more of display resolution, colour depth, frame rate or, audio data type(s) 15, and any remaining data 11 that does not conform to any one or more of said data type(s) 15 is discarded by dropping the respective packet. These checks can take place at a plurality of levels, depending on the user's preferences, which may be influenced by the amount of processing a user may wish to do on each packet, or how confident they are of the source of original data 8.

Specific video and audio formats such as one or more top-level container formats including but not limited to Matroska, FLV, MPEG, AVI, NSV etc, etc, can be checked using simple techniques such as in this first embodiment by verifying the file extensions (as examples only and not limited to for Matroska .webm or .mkv, for FLV .flv, for MPEG a large range from .mpg to .m4v and 0.3gp etc, for AVI .avi, and for NSV .nsv respectively), and simply assuming they are correct. Alternatively or additionally in another embodiment a user requiring more assurance may choose to test such an extension using an alternative means, such as by trying to use the remaining data 11 and determining if there is video-type content therein, by for example trying to play it using one or more media players appropriate for the purported file type. Alternatively or additionally in another embodiment packet headers could be checked using a string compare to verify what the packet payload claims to be using a further string compare on the packet header where its type will be set out.

In all such embodiments checking that remaining data 11 conforms to any one or more of display resolution, colour depth, frame rate or, audio data type(s) 15 can also include the verification of video and/or audio coding formats associated or contained within containers such as those identified above, and a user may choose what level of detail they wish to use for this. Most containers are only capable of holding specific file formats, so a user may check that firstly the container is a validly claimed format using the above file extension(s), and then may check the content of any such container for formats that are acceptable to that container type. In this first embodiment and for the sake of example only to aid the skilled reader, the user will determine that a container is present in the remaining data 11 which comprises a RealMedia® container (thus the file extension to be checked is a .rm file), and any other data which is not in such a container is discarded (by packets being dropped). Then the user will check that the content of the container comprises only RealVideo® and/or RealAudio® files, using in this embodiment simple string compares against packet headers to verify that only these file types are present. Any packets which do not comprise these file formats are dropped, discarding the data. This gives an efficiency to the process, as the remainder of original data 8 at that point is in effect, cleansed of anything not expressly in these file formats, meaning no further interrogation of data is required to be sure of this. This leaves resulting data 16 which is thus, substantially free of unwanted data.

This means a user can deploy the method 1*b* on a source of original data 8 (irrespective of its origin), to give themselves assurance that it only comprises the express data type(s) 15 as set out. This is advantageous not just should a third party have provided such original data 8 to a user, but also if a user has created or otherwise has an interest in original data 2 and may wish to display it or otherwise pass it to any third party (for example a second data device, not shown), they may deploy the method 1 and be assured that resulting data 6 is substantially free of unwanted data.

Figure 3:
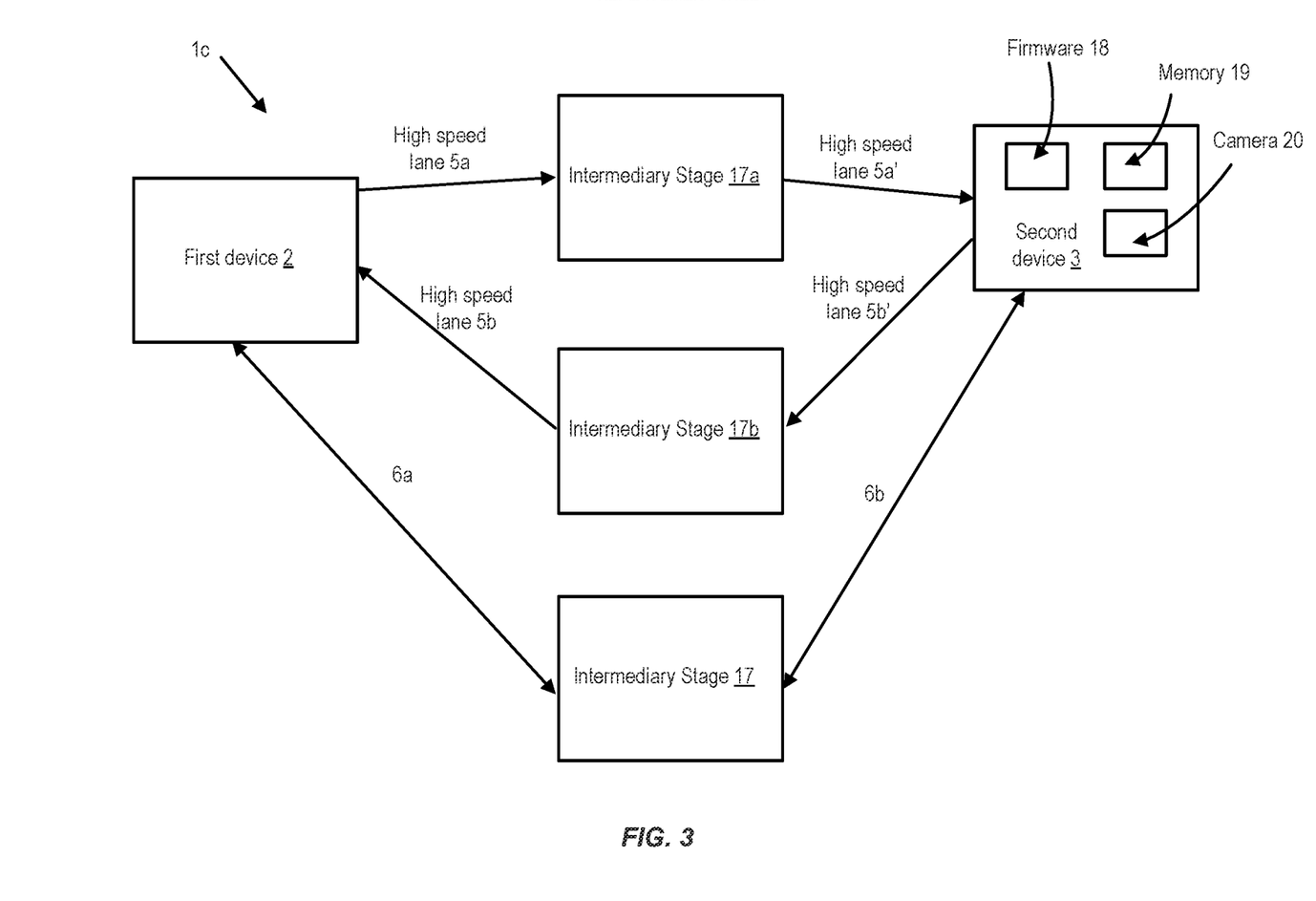
FIG. 3 shows a schematic representation of a system that applies the method steps of a second embodiment of the invention.

In yet another embodiment as shown in FIG. 3, original data 2 and/or remaining data 4 comprises a flow of data (not shown) arranged in to one or more lanes 5*a*, 5*a'*, 5*b*, 5*b'* between a first data device 2 and one or more second data device(s) 3.

This permits the user to deploy the method 1*b* between data devices, which is useful when, for example the user controls only one (or indeed none) of the respective devices. The user may choose to arrange the protocol data in to one or more lanes 5*a*, 5*a'*, 5*b*, 5*b'* for their own convenience, or it may be dictated by the protocol used or any hardware. One lane alone simply means data flows in one direction only from a first data device 2 to one or more second data device(s) 3. More than one lane permits the user to segregate data, be that in to high speed lanes 5*a*, 5*a'*, 5*b*, 5*b'* and low speed lanes 6, 6*a*, 6*b* from a first data device 1, or a return lane 6, 6*a*, 6*b* from one or more second data device(s) 3 which could be used to provide acknowledgement or instruction by such second data device(s).

Optionally in this embodiment a first data device 2 suitable for permitting a flow of data therefrom using a conventional or bespoke wired or wireless connection, and resulting data 16, which is substantially free of unwanted data, is permitted to continue to the one or more second data device(s) 3. Such a first data device 2 and a one or more second data device(s) 3 may comprise a computational device or a display device, however in this embodiment for the sake of example only the first data device 2 comprises a computational device, in this example case a PC, and the one or more second data device(s) 3 comprise a display device, in this example case a projector.

Optionally in this embodiment where a data flow is arranged in to one or more lanes 5*a*, 5*a*', 5*b*, 5*b*' between a first data device 2 and one or more second data device(s) 3, and a return lane 6*a*, 6*b* in the control channel from each of the one or more second data device(s) is identified, and data in said return lane that does not comprise screen resolution data is discarded. Identifying a lane 5*a*, 5*a*', 5*b*, 5*b*' may be a trivial matter if hardware dictates dedicated wires are used to effect specific directions of data flow; the method will simply assess hardware using conventional means (eg through sysinfo), or it may perform a test or request to determine the hardware or software method of creating arranging the flow of data into one or more lane(s) by interrogation and/or monitoring of the flow of data itself. Alternatively or additionally it may be necessary to apply a unity gain amplifier (not shown) and listen to the content to determine its direction. If no return lane is identified (because there is no feedback or response from one or more second data device(s) 3 then no work need be done. If a return lane is directed, the content is assessed by using string compares in packet headers to determine the content of packets in the lane, and any packets which do not comprise screen resolution data are dropped. Screen resolution data comprises either confirmation of what height and width of pixels are being displayed by the one or more second data device(s) 3, either directly with set values being stated or with a standard being stated from which the width/height of pixels can be inferred (eg if the standard is "SVGA" it means a width of 800 pixels and a height of 600 pixels). This data may be used by the first data device 2 to modify the data comprising the flow of data therefrom to appropriately suit the display characteristics of the one or more second data device(s) 3. Any packets in this return lane comprising different data are dropped, providing the user with assurance that one or more second data device(s) (not shown) are only returning or requesting basic information, and is not returning or requesting any different types of data.

As shown in FIG. 3 a negotiation process occurs at an intermediary stage 17 incorporating a negotiation means which is located intermediate the first data device 2 and the second data device 3 at or along the low speed lane 6*a*, 6*b* whereby the first data device 2 requests identification of the second device 3 and in doing so it requires information on a predetermined number of characteristics of the second data device 3. As such the first data device 2 specifies that it is only interested in verifying a minimum set of commands and purposefully eliminates verification of advanced features that may be associated with the second data device 3. This ensures that the information to be verified as supplied by the second data device 3 is limited to the features requested by the first data device 2. The permitted functionality i.e. the transfer of data between the first data device 2 and the second data device 3 is dependent upon these predetermined criteria as specified in the method. By applying the intermediary stage 17, neither the first data device 2 nor second data device 3 look towards each other and as such remain communicatively separate and distinct from each other at the negotiation stage i.e. the first data device 2 looks towards an intermediary stage 17 and the second data device looks towards the intermediary stage 17.

The second data device 3 which is a projector has native display characteristics e.g. information regarding its resolution as well as additional advanced characteristics such as information on its firmware 18, memory 19 and camera 20. The information on the advanced characteristics of the second data device 3 are of no interest to the first data device 2, which is only interested in information concerning the temporary display of data using the second data device 3. Information on these advanced characteristics can be eliminated and as such access to the advanced features of the projector is prohibited i.e. the method disables access to unnecessary hardware components in the second data device 3 when it is connected to the first data device 2. Similarly, whilst the second data device 3 may attempt to provide full identification information to the first data device 2 including information on advanced characteristics, only the protocol data associated with control data information requested by the first data device 2 and assessed at the intermediary stage 17 (incorporating the negotiation means 7) will be permitted passage along the data channel return lane 5*b*, 5*b*' and received by the first data device 2. Therefore, should the firmware 18, memory 19 and camera 20 be manipulated by a third party there is significantly reduced risk that data from the first data device 2 would be accessible to the third party. This is because data from the first data device 2 cannot be transferred to the advanced features e.g. firmware 18, memory 19 or camera 20 belonging to the second data device 3 (be it for real time or future access). Further, only predetermined data is transferred across to the second data device 3 and it is not possible for a third party to reach back from the second data device 3 to the first data device 2 to obtain information other than the acceptable values that have been predetermined by the first data device 2 or at the first intermediate stage 17.

Optionally in this embodiment a range of acceptable values for any one or more of; display resolution, colour depth, frame rate and/or audio data types is pre-determined, and after the step of discarding remaining data which does not comprise any one or more of display resolution, colour depth, frame rate and/or audio data types, is verified that any of said data fits within the range of acceptable values for the respective data type, and any which does not is discarded. Different levels of assurance may be provided depending on the requirement e.g. power constraints, time constraints or hardware constraints, to name but a few.

In a first example the verification is achieved through checking packet headers to determine their content, and then testing the absolute values contained in the payload using string compares being less than or equal to upper limits and greater than or equal to lower limits. This step ensures that a packet is not purporting to comprise data of any of these types but exhibits behaviour not reflective of that, providing the user with further assurance that data being sent comprises only the express data type(s) 15 as set out above.

Optionally in this embodiment a range of acceptable values conforming to one or more input device type (not shown) which is supported are pre-determined, which is tested using string compares against packet headers, and any packets that do not have acceptable values are discarded. Such an input device type may comprise a first data device 2 and/or one or more second data device(s) 3, or anything connected thereto. An alternative or additional method of checking input device types is through known Application Programming Interfaces (APIs) either custom made or those provided by operating system providers, which may also be used by this embodiment. Data will be dropped regardless of where it is in the process (original data and/or remaining data and/or data in a return lane as the case may be) if it does not conform to the one of more acceptable input device types, to ensure that for example, data is not being sent purporting to be from an original data source and in fact it is being provided by a further data source, perhaps a malicious user or a bot.

Optionally in this embodiment each lane for enabling passage of original data 8 and/or remaining data 11 is assessed, if any lane is found to be a high speed lane 5a, 5a', 5b, 5b' it is verified as being unidirectional. The unidirectional nature of the high speed lane is provided by the insertion of a unity gain amplifier (not shown) with high reverse isolation (ie a diode). The data passing along the high speed lane 5a, 5a', 5b, 5b' unidirectional pathway is not inspected and as such the data traffic is limited to keep within the power budget as derived by an electrical transfer means e.g. a cable. The method therefore enables multi string chaining of devices as a result of this power saving ability.

If the high speed lane 5a, 5a', 5b, 5b' is not unidirectional, all original data and/or remaining data as may be the case is discarded. As above certain hardware may dedicate lanes to high and low speed traffic, which can be checked in the manners outlined above as they are in this embodiment. For example with the Display Serial Interface (DSI) two modes are possible, LP (low power) or HS (high speed), a key indicator of which is that either the high speed clock is not enabled (LP mode) or it is (HS mode), which can be checked.

Optionally in this embodiment data which has been or is intended to be discarded is retained for use elsewhere. In this context the user may be interested in knowing what this extraneous data is, and if it is simple unharmful system data, for example configuration data, or if it is something which may be malicious, for example a request to copy or modify data that has no display benefit or purpose, and is perhaps not even original data. In this embodiment the data which has been or is intended to be discarded is retained by the method itself. Equally should the method so permit, such data may be copied elsewhere, for example to a computational device or to a display device (or indeed, both).

Optionally in this embodiment data which has been or is intended to be discarded is modified. This permits the user to ensure that is renders data substantially harmless by, for example as all example embodiments set out herein use IP, the user deletes the header from each packet, retaining only the payload. Additionally or alternatively the user may change or delete only some information from such header(s), for example by removing address information, but retaining sequencing and the like. Additionally or alternatively all addresses could be shifted so that the packets would not function as the originator expected, or new headers constructed replacing the originals. Additionally or alternatively the user may also decide to change the format of data, by for example converting one file type to another. In this example embodiment case they would test that a format is genuine, by transforming data in to a format that should work if a claimed type is genuine. So for example if a file claimed to comprise plain text, it would be converted to an Adobe® PDF format, which is known to work, and if successful it would show that the original file was that type.

Optionally in this embodiment "use elsewhere" of data which has been or is intended to be discarded and which has been modified is appended to original data and/or remaining data which has not been discarded. This is convenient for the user as it means they have access to data which would have exited the method, but without the risk that data which would otherwise have been discarded poses a threat. Appending data in this manner is a simple join of packet information as this embodiment contemplates IP as the protocol.

Various modifications to the principles described above would suggest themselves to the skilled person. For example, the same technique can be applied to other digital standards by altering the protocols and the file types that are permitted to pass between the first data device and the second data device. Further the intermediary stage as shown in FIG. 3 need not be separate and distinct from the first data device and/or second data device and may be an integral element at the output of the first data device or second data device. The intermediary stage is shown to comprise two separate and distinct stages (or devices) located in the first lane 5a, 5a' and return lane 5b, 5b' respectively, but may be instead formed of a single stage formed of a single device having two separate and distinct lanes passing therethrough. Alternative unidirectional circuit components may be applied in the high speed lane to give it a unidirectional nature instead of the unity gain amplifier not shown of FIG. 3, for example a SerDes pin may be applied.

In an alternative embodiment of the invention the first data device may further be prevented from connecting to an onward device attached to the projector. The onward device may be connected to the second data device directly or via a network, for example an Ethernet network. Therefore the first data device can be prevented from being in communication with the network to which the second data device or onward device is connected to.

In an alternative embodiment the first, trusted device may be connected to multiple lesser trusted peripheral devices. A device must be provided at each connecting pathway, or alternatively a single device may be configured to specify multiple data protocol modes and/or protocols.

The variables can be modified at a trusted device comprising either the first or second device.

The predetermined criteria and relevant thresholds to be negotiated at the negotiation stage may be set in code and/or in firmware.

It may be required for there to be provided multiple intermediary stages comprising one in each of the data channels as well as the control channel. Each intermediary stage may be configured to be in communication with the other intermediary stages as appropriate or at least for predetermined filtration requirements to be mirrored between each of the intermediary stages. The first intermediary stage 17 along the control channel and the other intermediary stages along the data channel are, as an example, devices formed of hardware for example a microprocessor to provide flexibility of use for the user and low power consumption. Whilst the thresholds can be fixed in the form of firmware it may also be desirable in certain embodiments for the thresholds to be capable of being varied through use of code.

Figures 4, 4B:
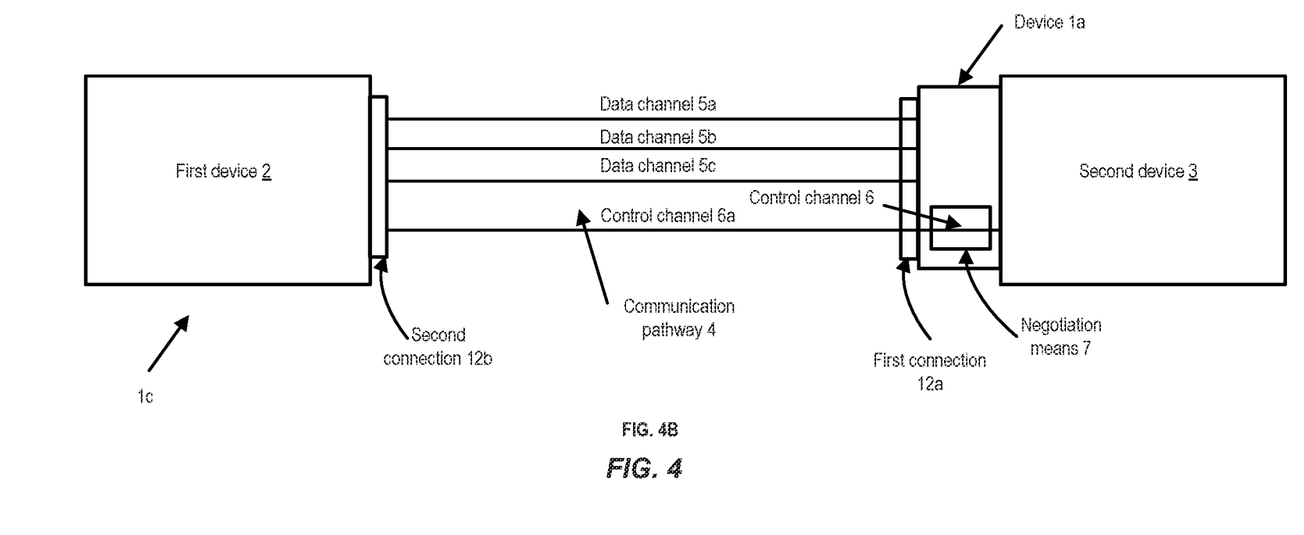
FIG. 4*b* shows the device integrated in the second data device.
Figure 4A:
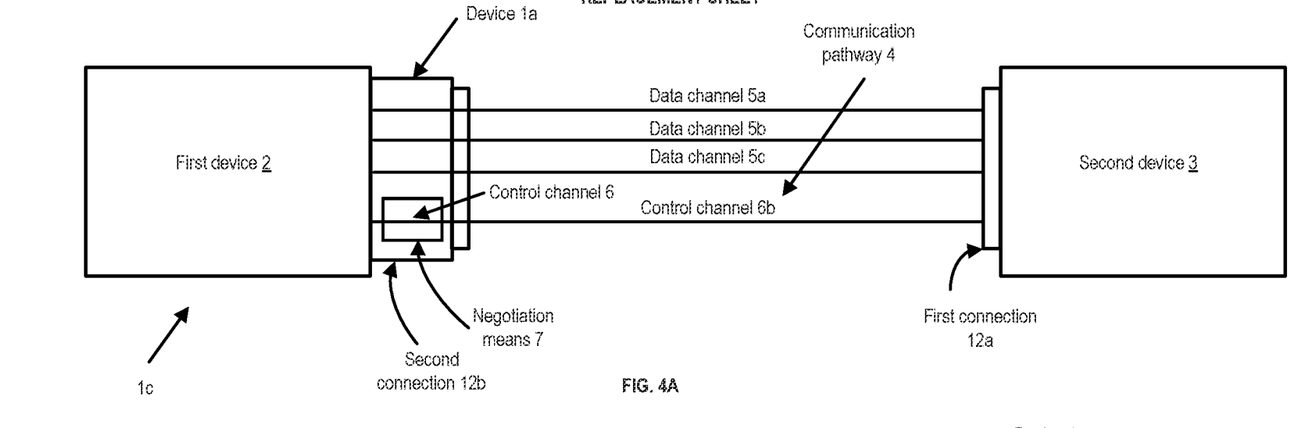
FIG. 4*a* shows the device integrated in the first data device.

As shown in FIG. 4a and FIG. 4b, the device 1a may conveniently be provided as part of a computational device 2, a display device, or both, should the user so wish, meaning the device is "built in" (be that physically inside or otherwise linked to extant hardware) to save on the user having to carry or provide a separate device to deploy the method steps and any optional variations thereof as outlined above. When the first data device in the embodiment is suitable for permitting a flow of data therefrom and comprises a first connection, a second connection, and a hardware core, for the convenience of the user they may simply have on such a computational and/or display device a first connection to which a source of original data may be connected should the originator be a third party, or alternatively if the user may wish to send data to a third party, they may deploy the method on such a computational and/or display device and use a second connection to permit a flow of data therefrom, safe in the knowledge anything exiting has had the method applied.

The invention claimed is:

1. A method of removing unwanted data from original data for prohibiting unwanted data transfer between a first data device and a second data device along a communication pathway located therebetween, the communication pathway comprising at least one data channel and at least one control channel, the method comprising:
providing a programmable hardware at a position along the at least one control channel;
providing original data comprising control data and associated protocol data from a data source, the control data specifying at least one property of the associated protocol data and comprising wanted and unwanted data;
comparing, in the control channel and via the programmable hardware, the control data to predetermined associated protocol data properties to be supported by verifying that the control data indicates that the associated protocol data does not conform to at least one predetermined supported protocol mode without checking the protocol data in the data channel directly;
based on the comparing, terminating the programmable hardware and determining the control data to be unwanted data; and
leaving resulting data comprising control data, wherein the control data is free of the unwanted data enabling associated protocol data transmission along the data channel.

2. The method of removing unwanted data from original data according to claim 1, wherein terminating the programmable hardware comprises discarding as unwanted data any control data that does not indicate the associated protocol data to conform to the at least one predetermined supported protocol mode.

3. The method of removing unwanted data from original data according to claim 1, wherein terminating the programmable hardware comprises generating and forwarding a response to the first data device indicating the control data is unwanted data.

4. The method of removing unwanted data from original data according to claim 1, wherein terminating the programmable hardware comprises transforming the unwanted data and forwarding a response to the first data device indicating the control data to be unwanted data.

5. The method of removing unwanted data from original data according to claim 1, further comprising, prior to comparing the control data to predetermined associated protocol data properties, determining one or more protocols to support by:
checking that control data indicates the associated protocol data to conform to the at least one predetermined supported protocol mode; and
terminating the programmable hardware where the control data does not indicate associated protocol data to conform to any one or more of the protocols to support.

6. The method of removing unwanted data from wanted data according to claim 1, wherein the control channel is configured to be hi-directional.

7. The method of removing unwanted data from original data according to claim 1, further comprising predetermining a directionality constraint on the associated protocol data to be transported along the data channel.

8. The method of removing unwanted data from original data according to claim 7, further comprising enforcing the directionality constraint on any protocol data transfer along the data channel.

9. The method of removing unwanted data from original data according to claim 7, further comprising discarding any protocol data, protocol mode data or other data that violates the directionality constraint.

10. The method of removing unwanted data from original data according to claim 1, further comprising disabling the programmable hardware, thereby disabling access to predetermined hardware of the second data device from the first data device or the predetermined hardware of the first data device from the second data device.

11. The method of removing unwanted data from original data according to claim 1, further comprising:
identifying at least one return lane in the communication pathway from each of the second data device; and
discarding control data in said return lane that does not comprise control data indicating associated protocol data which conforms to the one or more protocol mode.

12. The method of removing unwanted data from original data according to claim 1, further comprising:
pre-determining a range of acceptable variables against which the predetermined supported protocol mode is determined.

13. The method of removing unwanted data from original data according to claim 12, wherein the method further comprises enabling modification of the variables at a trusted device comprising either the first data device or second data device.

14. The method according to claim 1, wherein the at least one data channel comprises a communications lane where data transfer occurs at a faster rate than the data transfer along the control channel, wherein the at least one data channel is a high speed channel.

15. The method according to claim 14, wherein the protocol data and any other data is passed along the communications pathway forming the data channel without any further programmable hardware being applied along the control channel.

16. The method according to claim 14, wherein the high speed channel is unidirectional permitting passage of data either (a) from the first data device to the second data device only or (b) from the second data device to the first data device only.

17. The method of removing unwanted data from original data according to claim 14, further comprising:
assessing at least one channel in the communication pathway for passage of the original data, identifying high speed channels and verifying they are unidirectional; and
if any high speed channels are not unidirectional, discarding all original data attempting to pass in the reverse direction.

18. The method of removing unwanted data from original data according to claim 1, further comprising:
retaining control data which has been discarded to enable use elsewhere.

19. The method according to claim 18, further comprising forwarding the discarded data to a third device.

20. The method according to claim 1, wherein the predetermined supported protocol mode is defined as a protocol mode comprising an image data type.

21. The method of removing unwanted data from original data according to claim 20, wherein the image data type conforms to any one or more of display resolution, color depth and/or frame rate data types.

22. The method according to claim 1, wherein the predetermined supported protocol mode is defined as a protocol mode comprising at least one audio data type.

23. The method according to claim 22, wherein the at least one audio data type conforms to any one or more of audio protocol, audio sampling frequency, audio sampling rate, number of audio channels, but rate of audio channels, and directionality of audio data.

24. A device for assuring unwanted data is removed from original data arranged to implement the method of claim 1 comprising:
   a first connection,
   a second connection spaced apart from the first connection,
   a communications pathway positioned between the first connection and second connection, the communications pathway comprising at least one data channel and at least one control channel separate and distinct from the data channel, wherein the control channel comprises a programmable hardware.

25. The device according to claim 24, wherein the programmable hardware comprises a hardware core comprising hardware components.

26. The device for assuring unwanted data is removed from original data according to claim 25, wherein the hardware core comprises a Field Programmable Gate Array, an Application Specific Integrated Circuit, a general purpose platform with appropriate software or a dedicated circuit.

27. The device for assuring unwanted data is removed from original data according to claim 24, the device further comprising a processor having software to be executed to provide at least a portion of the programmable hardware along the control channel.

28. The device for assuring unwanted data is removed from original data according to claim 24, wherein at least one of the first connection and the second connection comprises a display port.

29. The device for assuring unwanted data is removed from original data according to claim 24, comprising at least one further connection.

30. The device for assuring unwanted data is removed from original data according to claim 24, wherein the at least one data channel comprises a unidirectional channel.

31. The device for assuring unwanted data is removed from original data according to claim 30, wherein the uni-directional channel comprises a hardware component.

32. The device for assuring unwanted data is removed from original data according to claim 24, wherein the at least one control channel is bi-directional.

33. A computational device comprising a device for assuring unwanted data is removed from original data according to claim 24.

34. A peripheral device located externally to the first data device, the peripheral device comprising a device for assuring unwanted data is removed from original data. according to claim 24.

* * * * *

UNITED STATES PATENT AND TRADEMARK OFFICE
CERTIFICATE OF CORRECTION

PATENT NO. : 11,526,478 B2
APPLICATION NO. : 16/968695
DATED : December 13, 2022
INVENTOR(S) : Robert John Dale and John Alan Thorp

It is certified that error appears in the above-identified patent and that said Letters Patent is hereby corrected as shown below:

In the Claims

Column 19, Line 65, replace "configured to be hi-directional" with -- configured to be bi-directional --.

Column 22, Line 28, replace "ing unwanted data is removed from original data. according" with -- ing unwanted data is removed from original data according --.

Signed and Sealed this
Eighteenth Day of April, 2023

Katherine Kelly Vidal
*Director of the United States Patent and Trademark Office*